(12) United States Patent
Grant et al.

(10) Patent No.: US 11,680,642 B2
(45) Date of Patent: Jun. 20, 2023

(54) SEAL ASSEMBLIES AND RELATED METHODS

(71) Applicant: Bal Seal Engineering, LLC, Foothill Ranch, CA (US)

(72) Inventors: Brandon Grant, Lake Forest, CA (US); David Wang, Tustin, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 309 days.

(21) Appl. No.: 16/405,819

(22) Filed: May 7, 2019

(65) Prior Publication Data

US 2019/0346045 A1 Nov. 14, 2019

Related U.S. Application Data

(60) Provisional application No. 62/668,394, filed on May 8, 2018.

(51) Int. Cl.
*F16J 15/32* (2016.01)
*F16J 15/3212* (2016.01)

(52) U.S. Cl.
CPC ................. *F16J 15/3212* (2013.01)

(58) Field of Classification Search
CPC ....... F16J 15/3212; F16J 15/025; F16J 15/028
See application file for complete search history.

(56) References Cited

U.S. PATENT DOCUMENTS

| | | |
|---|---|---|
| 3,223,426 A | 12/1965 | Reid |
| 3,647,226 A | 3/1972 | Middelkoop et al. |
| 4,103,909 A * | 8/1978 | Hoffman ............... F16J 15/3236 277/530 |
| 4,522,410 A | 6/1985 | Holzer |
| 4,585,238 A * | 4/1986 | Nicholson ............ F16J 15/3212 277/566 |
| 4,655,945 A | 4/1987 | Balsells |
| 4,804,290 A | 2/1989 | Balsells |

(Continued)

FOREIGN PATENT DOCUMENTS

| | | |
|---|---|---|
| AT | 507866 A1 | 8/2010 |
| CN | 204372400 U | 6/2015 |

(Continued)

OTHER PUBLICATIONS

Extended European Search Report from European Patent Office on co-pending EP application (EP 19172945.8) dated Sep. 19, 2019.

(Continued)

*Primary Examiner* — Eugene G Byrd
*Assistant Examiner* — L. Susmitha Koneru
(74) *Attorney, Agent, or Firm* — KOS IP Law LLP (57) ABSTRACT

A seal assembly can include a sealing component and a spring energizer located within a seal cavity or spring cavity of the sealing component. The sealing component provides an exterior surface for providing protection of the seal cavity and spring energizer from an external or contaminated environment, such as the atmosphere. The sealing component can have two distinct first and second sealing points. Each distinct first sealing point can have two discrete first sealing points and each second sealing point can have two discrete second sealing points. Part of the spring energizer can extend externally of the sealing component.

23 Claims, 6 Drawing Sheets

(56) References Cited

U.S. PATENT DOCUMENTS

| | | |
|---|---|---|
| 4,805,943 A | 2/1989 | Balsells |
| 5,072,070 A | 12/1991 | Balsells |
| 5,079,388 A | 1/1992 | Balsells |
| 5,091,606 A | 2/1992 | Balsells |
| 5,117,066 A | 5/1992 | Balsells |
| 5,134,244 A | 7/1992 | Balsells |
| 5,161,806 A | 11/1992 | Balsells |
| 5,265,890 A | 11/1993 | Balsells |
| 5,358,224 A | 10/1994 | Balsells |
| 5,474,309 A | 12/1995 | Balsells |
| 5,575,487 A | 11/1996 | Balsells |
| 5,599,027 A | 2/1997 | Balsells |
| 5,799,953 A | 9/1998 | Henderson |
| 5,979,904 A | 11/1999 | Balsells |
| 5,984,316 A | 11/1999 | Balsells |
| 5,992,856 A | 11/1999 | Basells et al. |
| 6,050,572 A | 4/2000 | Balsells et al. |
| 6,161,838 A | 12/2000 | Balsells |
| 6,264,205 B1 | 7/2001 | Balsells |
| 6,641,141 B2 | 11/2003 | Schroeder |
| 7,210,398 B2 | 5/2007 | Balsells |
| 7,464,750 B2 | 12/2008 | Schapel et al. |
| 8,096,559 B2 | 1/2012 | Cook |
| 8,328,202 B2 | 12/2012 | Foster et al. |
| 8,544,850 B2 | 10/2013 | Balsells et al. |
| 8,684,362 B2 | 4/2014 | Balsells et al. |
| 9,182,041 B2 | 11/2015 | Daub et al. |
| 9,194,497 B2 | 11/2015 | Rastegar |
| 9,234,591 B2 | 1/2016 | Dilmaghanian et al. |
| 9,285,034 B2 | 3/2016 | Balsells et al. |
| 9,357,684 B2 | 5/2016 | Foster |
| 2004/0183262 A1 | 9/2004 | Takahiro et al. |
| 2005/0220611 A1 | 10/2005 | Bhate et al. |
| 2009/0072495 A1 | 3/2009 | Kullen et al. |
| 2010/0237565 A1 | 9/2010 | Foster |
| 2011/0006486 A1 | 1/2011 | Niknezhad |
| 2013/0043661 A1 | 2/2013 | Binder et al. |
| 2014/0312570 A1 | 10/2014 | Foster |
| 2015/0159755 A1 * | 6/2015 | Whitlow .............. F16J 15/104 |
| | | 277/611 |
| 2016/0047473 A1 | 2/2016 | Foster et al. |
| 2016/0223086 A1 | 8/2016 | Balsells et al. |
| 2017/0172018 A1 | 6/2017 | Dilmaghanian et al. |
| 2017/0261108 A1 | 9/2017 | Soler et al. |
| 2017/0299056 A1 | 10/2017 | Azevedo et al. |
| 2017/0328474 A1 | 11/2017 | Balsells |
| 2018/0112778 A1 | 4/2018 | Dilmaghanian et al. |
| 2018/0119857 A1 | 5/2018 | Balsells |
| 2018/0266562 A1 | 9/2018 | Balsells |
| 2019/0170254 A1 * | 6/2019 | Taslakian .............. F16J 15/067 |
| 2019/0390774 A1 | 12/2019 | Jordan et al. |
| 2020/0208743 A1 * | 7/2020 | Duong ............... F16J 15/3232 |

FOREIGN PATENT DOCUMENTS

| | | | |
|---|---|---|---|
| DE | 2063452 A1 | 7/1972 | |
| DE | 8506768 U1 | 5/1985 | |
| EP | 0130867 A1 | 1/1985 | |
| EP | 3315752 A1 * | 5/2018 | ............ F16J 15/121 |
| FR | 733878 A | 10/1932 | |
| GB | 735801 A | 8/1955 | |
| GB | 758447 A | 10/1956 | |
| WO | WO-8602708 A1 * | 5/1986 | ............... F16J 15/14 |
| WO | 2018166863 A1 | 9/2018 | |

OTHER PUBLICATIONS

Office Action on corresponding foreign application (EP Application No. 19172945.8) from the European Patent Office dated Jan. 14, 2022.

Non-Final Office Action on co-pending US application (U.S. Appl. No. 17/397,180) dated Oct. 28, 2022.

Final Office Action on co-pending US application (U.S. Appl. No. 17/397,180) dated Feb. 22, 2023.

Office Action on corresponding foreign application (EP Application No. 19172945.8) from the European Patent Office dated Apr. 21, 2023.

* cited by examiner

SEAL ASSEMBLIES AND RELATED METHODS

FIELD OF ART

The invention pertains to seals for sealing, such as in rotary and oscillating applications, and related methods.

BACKGROUND

Seals for rotary and oscillating applications, such as in a manufacturing facility, in oil and gas applications, etc., need to maintain dynamic sealing between moving parts while avoiding exposed cavities or crevices. Dust, debris, or other contaminants may not be allowed to gather in or under the seal and the seal assembly should be designed to enable easy cleaning, such as by pressurized gas, such as air, fluid, or by manual cleaning, such as by scrubbing.

Typical canted coil spring energized seals in an axial face seal configuration comprise a seal cavity that is either inward facing or outward facing and energized by a canted coil spring. These configurations can present problems in regards to clean-ability and have the areas where dust, debris, or other contaminants can become stuck.

SUMMARY

Aspects of the invention are directed to seal assemblies. An exemplary seal assembly can comprise: a sealing component and a spring energizer; said sealing component comprising two sealing flanges defining a seal cavity, a seal lip located on each of the two sealing flanges, and a cover flange having an exterior surface and an interior surface; said spring energizer positioned within said seal cavity for biasing the two sealing flanges away from one another to provide a load onto said seal lips for sealing against two different surfaces; wherein radial-end-most surfaces of the two sealing flanges define an inside diameter of the sealing component and wherein the exterior surface is configured to be exposed to the atmosphere when in service; and wherein flange overhangs extend axially of a central part of the cover flange and axially of the two sealing flanges for providing cover for said seal cavity and said spring energizer or said spring energizer having portions that extend externally of the seal cavity towards a centerline of said sealing component.

The spring element can be a canted coil spring.

The seal assembly can further comprise a flange stub located between the two sealing flanges and in contract with the spring energizer.

The seal assembly can be practiced or put in use without a backing ring.

The flange overhangs can have interior surfaces that are sized to form an interference fit with structural components to be sealed by the seal assembly.

A support band can be located between the spring energizer and the sealing component.

The spring energizer can be a V-spring.

The V-spring can comprise a plurality of V-elements and wherein each V-element comprises two spring legs having free ends that point in a direction of the cover flange.

A V-element can have a joining end and wherein the joining end of the V-spring can extend outwardly of the seal cavity towards the centerline of said sealing component.

A support band can be located between the V-spring and the cover flange.

The inside diameter of the sealing component can be configured to form an interference fit with structural components to be sealed by the seal assembly.

Aspects of the invention include a method of making and of using a seal assembly. An exemplary method of using a seal assembly can comprise: placing the seal assembly between two adjacent structural components; sealing a gap between the two structural components; wherein the seal assembly comprises: a sealing component and a spring energizer; said sealing component comprising two sealing flanges defining a seal cavity, a seal lip located on each of the two sealing flanges, and a cover flange having an exterior surface and an interior surface; said spring energizer positioned within said seal cavity for biasing the two sealing flanges away from one another to provide a load onto said seal lips for sealing against two different surfaces of the two structural components; wherein radial-end-most surfaces of the two sealing flanges define an inside diameter of the sealing component and wherein the exterior surface is configured to be exposed to the atmosphere when in service; and wherein flange overhangs extend axially of a central part of the cover flange and axially of the two sealing flanges for providing cover for said seal cavity and said spring energizer or said spring energizer having portions that extend externally of the seal cavity towards a centerline of said sealing component.

The method can comprise forming a seal between the inside diameter of the sealing component and the two structural components. The inside diameter of the sealing component can have an interference fit with the two structural components.

A seal between the seal lip and the structural component can be along a first surface of the structural component and a seal between the inside diameter and the structural component can be along a second surface and wherein the first surface and the second surface can be angled to one another.

A broad concept of the invention can include a seal assembly comprising a sealing component and a spring energizer, wherein the sealing component comprises a seal body have a cover flange with an exterior surface and an interior surface, two sealing flanges extending away from the cover flange on a side of the interior surface, and wherein a spring energizer is located, at least in part, in a seal cavity defined by the two sealing flanges.

A still further feature of the invention is a seal assembly comprising a sealing component and a spring energizer for providing sealing between two components; said sealing component comprising a seal cavity, seal lips, and a flange portion; said seal cavity partially defined by said seal lips; said spring energizer positioned within said seal cavity for providing a load onto said seal lips for sealing against a surface; said flange portion extending from said sealing component for providing protection of said seal cavity and said spring energizer from an external environment; wherein said sealing component and said flange portion provide a smooth exterior surface in line with an exterior surface of both of said two components.

Another aspect of the invention can include a seal assembly comprising a sealing component and a spring energizer; said sealing component comprising a seal cavity and seal lips; said seal cavity partially defined by said seal lips; said spring energizer positioned within said seal cavity for providing a load onto said seal lips for sealing against a surface; said seal lips extending from said sealing component for providing protection of said seal cavity and said spring energizer from a contaminated environment.

A still further aspect is a seal assembly comprising a sealing component and a spring energizer for providing sealing between two components; said sealing component comprising a seal cavity and seal lips; said seal cavity partially defined by said seal lips; Said spring energizer positioned within said seal cavity for providing a load onto said seal lips for sealing against a surface; said flange portion extending from said sealing component for providing protection of said seal cavity and said spring energizer from an external environment; wherein said sealing component and said flange portion provide a smooth exterior surface in line with an exterior surface of both of said two components.

A still yet further aspect of the invention is seal assembly comprising a sealing component and a spring energizer; said sealing component comprising a seal cavity, seal lips, and a flange portion; said seal cavity partially defined by said seal lips; said spring energizer positioned within said seal cavity for providing a load onto said seal lips for sealing against a surface; said flange portion extending from said sealing component for providing protection of said seal cavity and said spring energizer from a contaminated environment.

A seal assembly provided herein can comprise a sealing component or seal element and a spring energizer located between two structural elements or components. The two structural elements or components can be any number of devices or components for which the seal assembly of the present invention is used to seal a seam or gap therebetween. For example, the first structural element can be a flange, a plate, or a cap having surfaces and the second structural element can be a housing, a base, a hub, etc. having surfaces and wherein a seal assembly in accordance with aspects of the present invention is configured to seal a gap or space between the surfaces of the two structural components or elements. These examples of structural components are understood to be non-limiting.

In an example, each structural component, or at least one of the two structural components, has at least two generally planar surfaces that are angled to one another. Seal assemblies of the present invention can seal against the two planar surfaces of the one or two structural components that are angled to one another.

The two structural elements or components can have a centerline □ passing through both. Thus, the various figures depicted herein are understood to depict only a partial cross-section of the seal assembly or components represented by the figure in question.

In an example, the seal element or sealing component is made from a polymer material, which in one embodiment is a PTFE (polytetrafluoroethylene) material. Other polymer and PTFE-based composite materials may be used, such as ultra-high molecular weight polyethylene (UHMWPE), nitrile (Buna-N), polyurethane, fluorosilicone, EPDM (ethylene-propylene) rubber, Kalrez®, Aflas®, Chemraz®, fluorocarbon, neoprene/chloroprene, to name a few non-limiting examples.

The seal element or sealing component can comprise a seal body having a cover flange and two sealing flanges extending from the cover flange. If the seal body has a ring or annular configuration, as indicated by the centerline □, which can represent the inside or interior of the seal element, the cover flange may be considered an exterior flange since it is remote from the interior referenced by the centerline.

The cover flange has an exterior surface and an interior surface defining a thickness therebetween. The cover flange can comprise two spaced apart end edges defining a width therebetween. The width of the cover flange can also be the width of the seal element. Optionally, intersections between the exterior and interior surfaces and the two end edges can include chamfered or rounded corners.

The receiving space between the two sealing flanges can define a seal cavity having the spring energizer located therein for urging the two sealing flanges away from one another. Because the cavity of the seal element or seal component, also called a seal cavity, is configured to receive a spring energizer, the cavity may also be referred to as a spring cavity.

Each sealing flange has an inside surface facing the spring cavity and an outside surface facing away from the spring cavity. The spring energizer urges the two sealing flanges away from one another so that a load is provided on the seal lips of the two sealing flanges to press and seal against the seal contact surfaces of the two structural elements.

The spring energizer can be a canted coil spring, which can have a plurality of interconnected coils with each coil canted generally along the same direction. As is generally known in the art, the canted coil spring can have a coil axis extending through the center of the plurality of coils and a ring axis, which can be coincident with axis defined by the centerline □ of the seal element.

Each coil can have a major axis and a minor axis, which is the smaller of the two axes of the elliptical shape coil. Further, each spring can be turned to cant when a force is applied axial to the centerline, otherwise known as an axial canted coil spring, or when a force is applied radial to the centerline, otherwise known as a radial canted coil spring. An axial canted coil spring is further described in U.S. Pat. No. 4,876,781 to Balsells, and a radial canted coil spring is further described in U.S. Pat. No. 4,974,821 also to Balsells. The contents of the '781 patent and the '821 patent are expressly incorporated herein by reference as if set forth in full. In the present embodiment, the canted coil spring is preferably an axial canted coil spring.

In an example, the exterior flange or cover flange, because it provides cover for the spring cavity from an exterior environment, defines a continuous band or loop, which can be round with other shapes contemplated. The exterior environment can be a warehouse, a manufacturing plant, a production plant, an assembly line, etc., to name a few non-limiting examples. The band or loop of the exterior flange or cover flange can have an exterior surface and an interior surface. In use, the exterior surface of the cover flange is configured to be exposed to or faces the atmosphere.

The two sealing flanges extend from the cover flange from positions that are inward from the end edges, and extend towards the centerline ₵. The two sealing flanges have radial-end-most surfaces from the cover flange, radially extending relative to the axis defined by the centerline, that point in the direction of the centerline. Said differently, the two sealing flanges have free ends that point in the direction of the centerline.

In an example, the two sealing flanges are equally spaced inwardly from the two end edges. In other examples, the two sealing flanges are spaced an unequal amount from the two end edges. The unequal spacing can be selected based on the space requirement of the flange seat of the first structural element and the flange seat of the second structural element.

The two sealing flanges can define a gap, which can be called a sealing flange gap. The sealing flange gap can be measured from the outer surfaces of where the sealing lips are formed. The exterior flange can have a width, defined by the two end edges, that is larger than the sealing flange gap to define the two flange overhangs.

In an example, the sealing flange gap is about 30% to 80% of the width of the cover flange, with the range of 40% to 65% being more preferred. Each of the two flange overhangs can be part of the cover flange and extends axially, relative to the axis defined by the centerline ₵, away from the two sealing flanges. Each flange overhang can comprise an interior surface and an exterior surface, and by extension the cover flange or exterior flange has an interior surface and an exterior surface. The interior surface of the cover flange at the two flange overhangs can press against the flange seats of the two structural elements to ensure a positive seal at the interface thereof. For example, the cover flange can be formed with an inside diameter (ID) defined at the interior surface to provide a slight interference fit against the two flange seats of the two structural components. In some examples, the cover flange can have a size on size fit with the flange seats without interference. In still other examples, the two end edges can be sized to press against the adjacent surface of the adjacent structural component.

The flange seat and the seal contact surface of the first structural element can have surfaces that are angled to one another. The surface of the flange seat can be approximately at right angle to the surface of the seal contact 300 of the first structural element. In other examples, due to the shape of the first structural element, the angle can vary from right angle, such as being less than 90 degrees or greater than 90 degrees.

The flange seat and the seal contact surface of the second structural element can have surfaces that are angled to one another. The surface of the flange seat can be approximately at right angle to the surface of the seal contact surface of the second structural element. In other examples, due to the shape of the second structural element, the angle can vary from right angle, such as being less than 90 degrees or greater than 90 degrees. Because the first structural component, the second structural component, or both the first and second structural components have surfaces that are angled to one another, the seal assembly of the present embodiment can seal against the two surfaces that are angled to one another of one or both structural components.

The spring energized sealing lips 124, 126 of the seal assembly can seal at a location below or inwardly of the flange overhangs, or interiorly relative to the cover flange. The sealing forces between the seal element and the structural components can be forces that are axial relative to the axis defined by the centerline ₵, and optionally radial to the centerline, such as between the ID of the cover flange and the two flange seats. For example, the spring element can bias the two sealing flanges to force the seal lips to seal against the two seal contact surfaces of the two structural components with forces that are generally parallel to the centerline ₵ and the annular configuration of the cover flange can be sized so that the interior surface, or the ID, presses against the two flange seats with forces that are generally radial to the axis defined by the centerline ₵.

In an example, a flange stub can be incorporated. When incorporated, the flange stub can extend from the interior surface of the cover flange towards the centerline ₵, similar to the two sealing flanges. The flange stub can be located between the two sealing flanges and can have a length that is substantially shorter than the length of the two sealing flanges.

In the example shown, the flange stub is incorporated to set the location or position of the spring element within the spring cavity. For example, the flange stub pushes the spring element away from the cover flange towards the centerline ₵. In effect, this positions the spring element to contact the two sealing flanges at locations on the two sealing flanges that are closer to the centerline than when the seal element is without a flange stub. The flange stub therefore moves the spring element to control where the sealing flanges contact the minor axes, the shorter of the two axes, of the plurality of coils of the spring element.

Spring elements described herein may be made from any number of conventional metallic materials and can optionally be plated or coated with a second metallic layer or coat.

The flange stub is preferably located equally spaced between the two sealing flanges in the spring cavity. However, the flange stub can be omitted or can be off-centered between the two sealing flanges. The edge of the flange stub that contacts the spring energizer can be generally flat. In other examples, the surface of the flange stub that contacts the spring energizer can be concave to receive an arc section of the plurality of coils of the spring energizer. In still other examples, the surface that contacts can have a convex surface. Even when a flange stub is incorporated, the spring element can be recessed inside the spring cavity, which is understood to mean recessed inside, or away from the centerline, the interior-most surfaces of the two sealing flanges. In contrast and as further discussed below, the spring element of FIG. 2 projects outwardly of the spring cavity, which is understood to mean outwardly of the interior-most surfaces of the two sealing flanges.

The seal element can be unitarily formed with a seal body having the various components shown, such as the cover flange, the two sealing flanges, and the flange stub, if incorporated. Each of the two sealing flanges can have a base attached to the cover flange and a remote flange arm portion extending from the base and remote from the cover flange. The base of each sealing flange can have a thickness and the remote flange arm portion can have a thickness and the thickness of the remote flange arm portion can be larger or thicker than the thickness of the base.

Each sealing flange can have an end stub at the end of the remote flange arm. The two end stubs at the two ends of the two remote flange arms reduce the opening to the seal cavity or spring cavity, making the spring energizer more difficult to slip out of the spring cavity during service or during installation. The two sealing flanges have end most surfaces that define an inside diameter of the sealing element.

During use or when the seal assembly is in service, the seal assembly may be exposed to an external environment that may be dirty or contaminated. For example, particulates, debris, dust, organic matters, etc. may be pushed around or agitated by air flow or breeze in the external environment, which can then deposit in cracks and crevices, including in the seal cavity or spring cavity and between the cover flange and the surfaces of the first and second structural elements that contact the seal body of the seal element. Thus, by incorporating a cover flange with two flange overhangs with end edges, which the sealing flanges recessed axially inwardly thereof, the seal element provides a cover or outer seal protection to prevent contaminants from reaching the seal cavity, and can also prevent contaminants from reaching the interface between the two sealing flanges and the two corresponding seal contact surfaces. As further discussed below, seal assemblies of the present invention can also incorporate additional sealing points aside from seals between the seal lips and the structural components to provide additional seals from contaminants.

A seal assembly provided herein can comprise at least two sealing points or locations. The first sealing point or location can be between the cover flange, and more particularly the interior surfaces of the two flange overhangs, and the flange seats of the first and second structural components. The second sealing point or location is between the two sealing lips of the two sealing flanges and the two seat contact surfaces of the first and second structural components.

In an example, the first sealing point or location, which can have two discrete first sealing points at each of the two flange seats and the cover flange, can be located axially outwardly of the second sealing point or location, which can have two discrete second sealing points at each of the two sealing lips of the two sealing flanges and the two seat contact surfaces of the first and second structural components.

Figure 2:
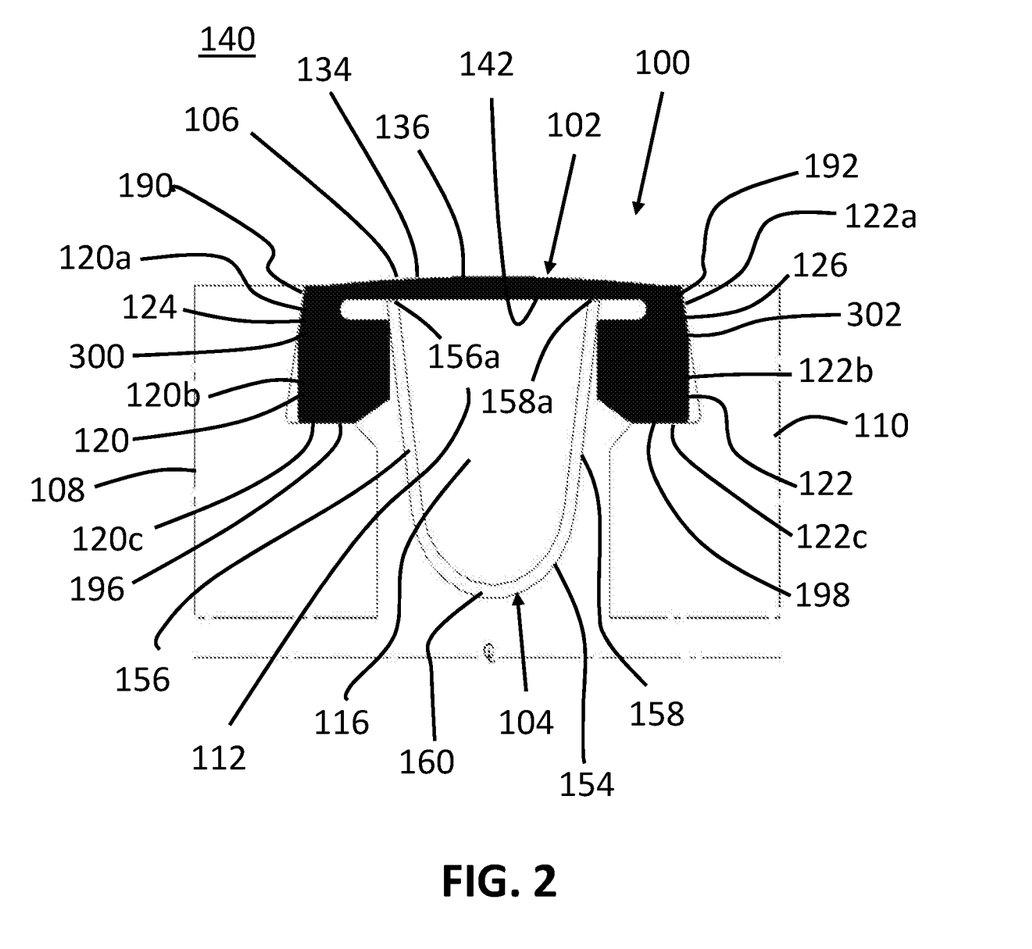
FIG. 2 is a partial cross-sectional side view of another seal assembly sealing against two structural components, shown in dashed lines.

In the FIG. 2 embodiment, the seal assembly can comprise a sealing component, or seal element, and a spring energizer for biasing two sealing lips away from one another to seal against two structural elements. The sealing component can comprise a seal body having two sealing flanges defining a seal cavity or spring cavity. A spring energizer can be a V spring, such as those disclosed in U.S. Pat. Nos. 2,434,484 and 2,630,343 and U.S. Publication No. 2018/0266562, the contents of which are expressly incorporated herein by reference.

The spring energizer can be located in the spring cavity for biasing the two sealing flanges away from one another to push the two seal lips on the two sealing flanges against the seal contact surfaces of the two structural components, in an axial direction relative to the axis defined by centerline □, to seal against the seal contact surfaces.

Each of the two sealing flanges can have a seal lip and the two seal lips are configured to seal, via axially biasing forces generated by the spring element, against the two seal contact surfaces of the two structural components. The seals formed by the seal assembly with the two seal contact surfaces of the two structural components limit or restrict unwanted contaminants from entering and depositing in the spring cavity.

Each sealing flange of the two seal flanges can comprise a base and a remote flange arm portion. The remote flange arm portion of each sealing flange can be thicker than the thickness of the corresponding base. In an example, the two sealing flanges are not recessed from the two end edges of the cover flange, which has an exterior surface and an interior surface. In an example, the two bases of the two sealing flanges have outer surfaces that are co-planar with the two end edges.

Each sealing flange can have a radial-end-most surface at the end of the remote flange arm portion. The two radial-end-most-surfaces of the two sealing flanges can define an inside diameter (ID) or bore diameter of the seal element. In an example, the bore diameter, or inside diameter of the seal element, can be sized to form an interference fit with the two flange seats of the two structural components to thereby form seals at the interfaces where they contact.

The seal assembly of FIG. 2 can have at least two sealing points. The first sealing point or location is between two sealing lips and the two seal contact surfaces of the two structural components. The second sealing point or location is between the two radial-end-most-surfaces of the two sealing flanges and the two flange seats of the two structural components. Each sealing point or location can have two discrete sealing points or locations.

The first sealing point or location, which can have two discrete first sealing points at each of the seal contact surfaces and the two sealing lips, can be located axially outwardly of the second sealing point or location, which can have two discrete second sealing points at each of the two radial-end-most surfaces of the two sealing flanges and the flange seats of the first and second structural components.

In an example, the seal assembly has only the first sealing point or location between the seal contact surfaces and the two sealing lips and not the second sealing point or location. In other words, the inside diameter of the seal element can have a size on size or a loose fit around the flange seats. This is because the first sealing point or location, which is located axially outwardly of the second sealing point or location, can provide adequate sealing from contaminants without resorting to the second sealing point or location. More specifically, since the seals between the seal contact surfaces and the two sealing lips are biased or urged by the spring element, which form solid or strong seals, additionally seals may not be necessary, although optional.

The seal assembly, and more specifically the exterior surface of the cover flange is configured to be exposed to or faces the atmosphere. More specifically, the cover flange is configured to operate outside of a pressurized environment, excluding atmospheric pressure.

A V-spring used herein can comprise a plurality of interconnected V-elements each with two spring legs joined together at a joining end. The two spring legs bias the two sealing flanges away from one another to bias the two sealing lips against the two structural components.

In an example, the two sealing flanges can be modified or re-positioned to be closer to the exterior flange and extend from the end edges of the exterior flange or cover flange. The two spring legs can have free ends that contact the interior surface of the exterior flange. In alternative embodiments, the free ends can be spaced from the interior of the exterior flange or cover flange.

The free ends of the V-element can face or point in the direction of the cover flange while the joining end faces or points away from the cover flange, in the direction of the centerline. Additionally, the spring element can have portions that project outwardly of the seal element. For example, the joining ends of the V-elements, and part of the two spring legs, can project outwardly of the radial-end-most surfaces of the two sealing flanges, which define the inside diameter of the seal element, toward the centerline □.

In an example, two support bands can be provided at the interior surface of the exterior flange or cover flange to support each of the two end edges of the free ends of the two spring legs 156, 158 of a V-spring. The support bands prevent the two end edges from digging into the cover flange. In an example, the two support bands can be made from a material that is harder than the material of the sealing component, for example from a metallic or alloy material or from a hard plastic. The two support bands can be made from the same material or from two different materials, such as two different metallic materials or one from a metallic material and the other from a hard plastic material.

In an example, only a single support band is used to support the two end edges of the two free ends of the two spring legs. In some examples, a support band can also be used to support a canted coil spring. For example, the single support band of FIG. 4 can be used to support the canted coil spring of FIG. 1 or of FIG. 5, as further discussed below.

Figure 3:
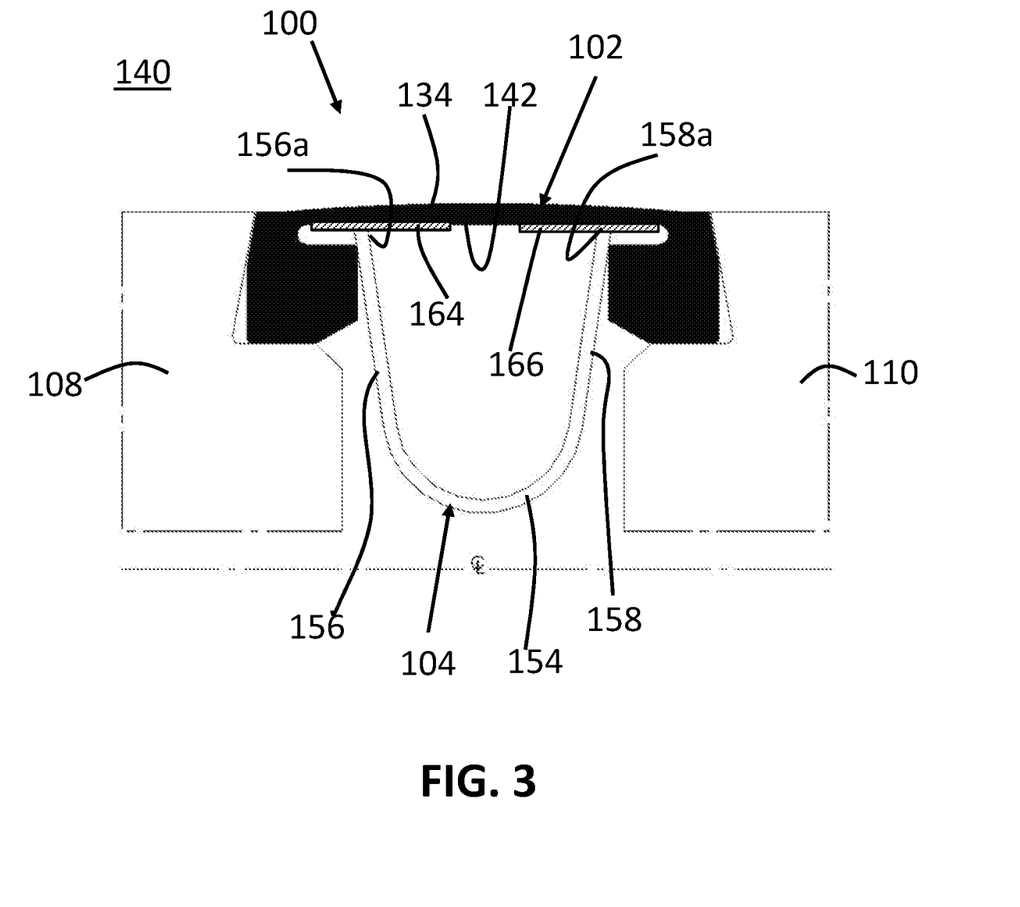
FIG. 3 is a partial cross-sectional side view of yet another seal assembly sealing against two structural components, shown in dashed lines.
Figure 4:
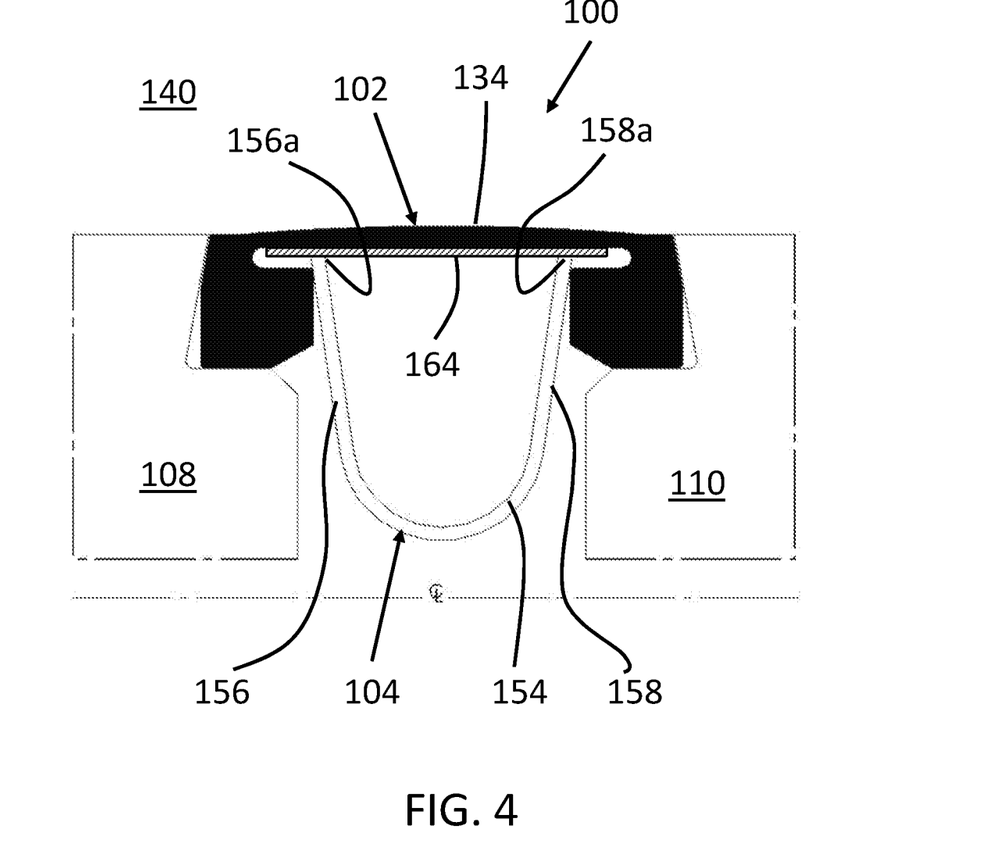
FIG. 4 is a partial cross-sectional side view of still yet another seal assembly sealing against two structural components, shown in dashed lines.

In the present embodiment, the two bases of two sealing flanges can be elongated compared length of the two bases of the seal elements of FIGS. 2-4 in order to extend the positions or locations of the two remote flange arm portions toward the centerline □. This lengthening of the bases extend the two remote flange arm portions further toward the centerline so that the minor axes of the plurality of spring coils of the spring element directly contact the two remote flange arm portions.

The minor axes of spring coils of a canted coil spring can directly contact the remote flange arm portions of the two sealing flanges to bias the sealing lips against the two seal contact surfaces of the two structural components. In other examples, the lengths of the two bases can remain substantially the same compared to the bases of FIGS. 2-4 and instead the lengths of the remote flange arm portions are lengthened compared to the lengths of the remote flange arm portions of other seal elements discussed elsewhere herein. In yet other examples, both the bases and the remote flange arm portions of the two sealing flanges are adjusted to ensure direct contact between the minor axes of the plurality of coils and the remote flange arm portions.

A canted coil spring can be used as a spring element instead of a V-spring for a sealing component in which part of the coils of the canted coil spring project outwardly of the seal cavity. At least a portion of each spring coil can extend outwardly of the radial-end-most surfaces, or bore diameter of the sealing component, toward the centerline □. Optionally, a support band, similar to the support band of FIG. 4, may be used between the canted coil spring and the interior surface of the cover flange to protect the cover flange from being scuffed up by the coils.

In an example, the two spring legs of a V-element can be modified so that generally flat or generally planar end surfaces are provided at the end opposite the joining end of the V-element. In an example, the generally planar end surfaces can be formed by bending the two free ends of the two spring legs to have short end stubs that define the two planar end surfaces. Thus, when the two generally planar end surfaces are pushed against the interior surface of the cover flange, the two generally planar end surfaces do not bite or cut into the cover flange compared to when the two edges of the two free ends of the V-elements are allowed to directly push against the cover flange. The present V-spring can therefore be used with the seal element without the need for one or more support band although they can be used or incorporated.

The sealing component or seal element can have two channels, one between each of the two remote flange arm portions and the cover flange. The gap of each of the two channels can be adjusted by adjusting the length or thickness of the base portion, the remote flange arm portion or both of each sealing flange. The dimension of each channel can be selected to accommodate the planar end surfaces of the spring legs, the support bands, or both the planar end surfaces and the support bands.

Other obvious variations and modifications, including methods of making and of using the seal assemblies and components thereof are within the scope of the invention.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of seal assemblies provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Aspects of the present invention are directed to seal assemblies designed with features or structures, such as surfaces, on the outer diameter of a seal element to offer protection or cover for one or more cavities of the seal element and a spring energizer contained in one of the one or more cavities to better isolate the same from a contaminated environment or from contaminants within an environment.

Aspects of the present invention further include a seal assembly comprising a sealing component and a spring energizer. The sealing component can comprise a seal cavity, or a spring cavity, for accommodating a spring that is located interior to an outer flange or cover flange comprising flange overhangs. An energizer can locate within the seal cavity, also referred to as a spring cavity. The energizer can comprise a spring, such as a canted coil spring, a V-spring, or a ribbon spring, for providing a load against two spaced apart seal lips for forming seals between the spaced apart seal lips and surfaces of structural components to be sealed. The sealing component can provide an exterior surface for providing protection or cover to the seal cavity and the spring energizer from an external or contaminated environment. In an example, seal assemblies of the present invention can seal two or more generally planar surfaces of the same structural component and wherein the two or more generally surfaces are angled to one another.

In an embodiment, the seal assembly can comprise a seal body having a cover flange and two sealing flanges, each with a seal lip, extending from the cover flange and extending towards an axis defined by a centerline □. Radial-end-most surfaces of the two sealing flanges, relative to the axis defined by the centerline, are pointed in the direction of centerline. In use, the cover flange from which the two sealing flanges extend has an exterior surface that is configured to be exposed to the atmosphere. The seal element can be practiced without any flange overhang and at least part of a spring element can be placed in a spring groove defined by the two sealing flanges and having at least a portion extending outside of the spring groove. Still further, the present seal assembly is configured to operate without any backing ring. A backing ring is typically a rigid structure, such as a structure made from a metallic material, that is provided to support at least part of the seal element to assist the seal element from being extruded or pushed from a high pressure source.

Figure 1:
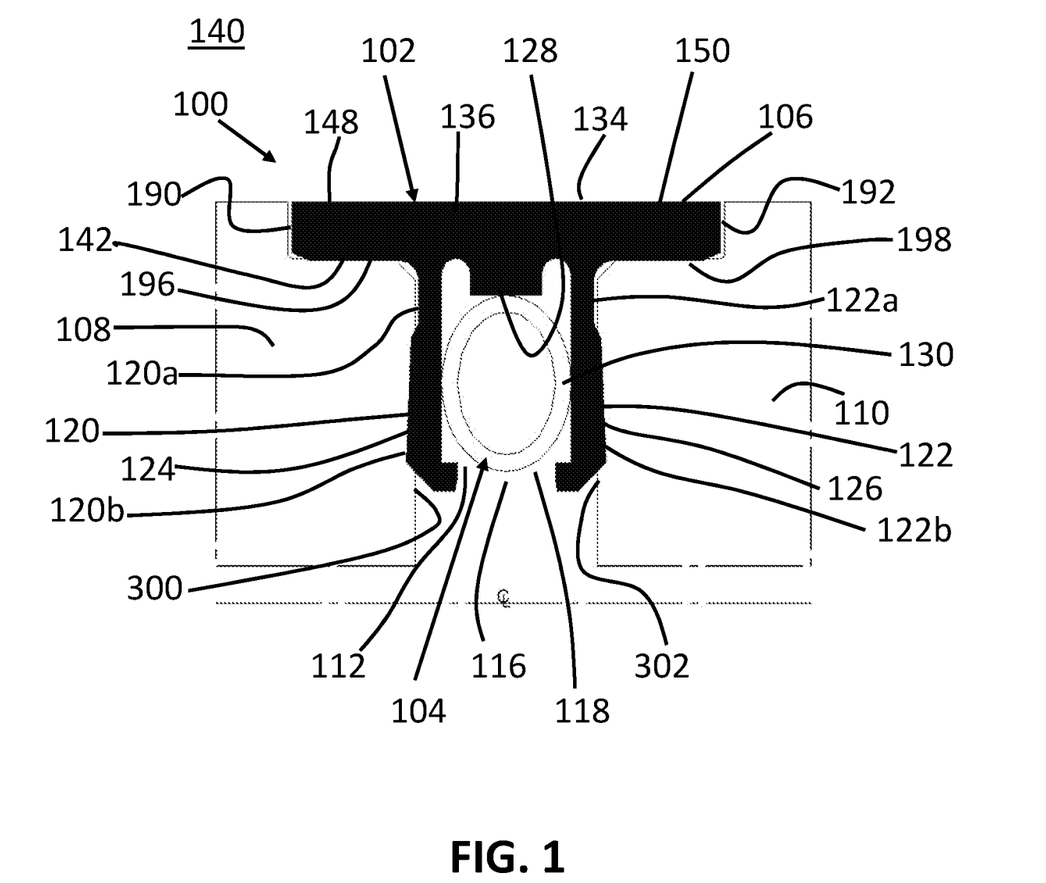
FIG. 1 is a partial cross-sectional side view of a seal assembly sealing against two structural components, shown in dashed lines.

With reference now to FIG. 1, a seal assembly 100 comprising a sealing component or seal element 102 and a spring energizer 104 is shown located between two structural elements or components 108, 110, shown in schematic. The two structural elements or components 108, 110 can be any number of devices or components for which the seal assembly 100 of the present invention is used to seal a seam or gap 112 therebetween. For example, the first structural element 108 can be a flange, a plate, or a cap having surfaces and the second structural element 110 can be a housing, a base, a hub, etc. having surfaces and wherein a seal assembly in accordance with aspects of the present invention is configured to seal a gap or space between the surfaces of the two structural components or elements. In an example, each structural component, or at least one of the two structural components, has at least two generally planar surfaces that are angled to one another. Seal assemblies of the present invention can seal against the two planar surfaces of the one or two structural components that are angled to one another.

The two structural elements or components 108, 110 can have a centerline □ passing through both. Thus, FIG. 1 and the various other figures depicted herein are understood to depict only a partial cross-section of the seal assembly or components represented by the figure in question.

In an example, the seal element or sealing component 102 is made from a polymer material, which in one embodiment is a PTFE (polytetrafluoroethylene) material. Other polymer and PTFE-based composite materials may be used, such as ultra-high molecular weight polyethylene (UHMWPE), nitrile (Buna-N), polyurethane, fluorosilicone, EPDM (ethylene-propylene) rubber, Kalrez®, Aflas®, Chemraz®, fluorocarbon, neoprene/chloroprene, to name a few non-limiting examples.

As shown, the seal element or sealing component 102 comprises a seal body 106 having a cover flange 134 and two sealing flanges 120, 122 extending from the cover flange 134. If the seal body 106 has a ring or annular configuration, as indicated by the centerline □, which can represent the inside or interior of the seal element, the cover flange 134 may be considered an exterior flange since it is remote from the interior referenced by the centerline. The cover flange 134 has an exterior surface 136 and an interior surface 142 defining a thickness therebetween. The cover flange 134 further comprises two spaced apart end edges 190, 192 defining a width therebetween. The width of the cover flange 134 can also be the width of the seal element 102. Optionally, intersections between the exterior and interior surfaces 136, 142 and the two end edges 190, 192 can include chamfered or rounded corners.

The receiving space between the two sealing flanges 120, 122 can define a seal cavity 116 having the spring energizer 104 located therein for urging the two sealing flanges 120, 122 away from one another. Because the cavity 116 of the seal element or seal component 102, also called a seal cavity 116, is configured to receive a spring energizer 104, the cavity may also be referred to as a spring cavity. Each sealing flange 120, 122 has an inside surface facing the spring cavity 116 and an outside surface facing away from the spring cavity. The spring energizer 104 urges the two sealing flanges 120, 122 away from one another so that a load is provided on the seal lips 124, 126 of the two sealing flanges 120, 122 to press and seal against the seal contact surfaces 300, 302 of the two structural elements 108, 110.

In the embodiment of FIG. 1, the spring energizer 104 can be a canted coil spring, which can have a plurality of interconnected coils 130 (only one shown) with each coil canted generally along the same direction. As is generally known in the art, the canted coil spring 104 can have a coil axis extending through the center of the plurality of coils 130 and a ring axis, which can be coincident with axis defined by the centerline □ of the seal element 102. Each coil can have a major axis and a minor axis, which is the smaller of the two axes of the elliptical shape coil 130. Further, each spring can be turned to cant when a force is applied axial to the centerline, otherwise known as an axial canted coil spring, or when a force is applied radial to the centerline, otherwise known as a radial canted coil spring. An axial canted coil spring is further described in U.S. Pat. No. 4,876,781 to Balsells, and a radial canted coil spring is further described in U.S. Pat. No. 4,974,821 also to Balsells. The contents of the '781 patent and the '821 patent are expressly incorporated herein by reference as if set forth in full. In the present embodiment, the canted coil spring 104 is preferably an axial canted coil spring.

In an example, the exterior flange or cover flange 134, because it provides cover for the spring cavity 116 from an exterior environment 140, defines a continuous band or loop, which can be round with other shapes contemplated. The band or loop of the exterior flange or cover flange 134 can have an exterior surface 136 and an interior surface 142. In use, the exterior surface 136 of the cover flange 134 is configured to be exposed to or faces the atmosphere 140. The two sealing flanges 120, 122 extend from the cover flange 134 from positions that are inward from the end edges 190, 192, and extend towards the centerline ℄. The two sealing flanges 120, 122 have radial-end-most surfaces from the cover flange 134, radially extending relative to the axis defined by the centerline, that point in the direction of the centerline. Said differently, the two sealing flanges 120, 122 have free ends that point in the direction of the centerline.

In an example, the two sealing flanges 120, 122 are equally spaced inwardly from the two end edges 190, 192. In other examples, the two sealing flanges are spaced an unequal amount from the two end edges 190, 192. The unequal spacing can be selected based on the space requirement of the flange seat 196 of the first structural element 108 and the flange seat 198 of the second structural element 110.

As shown, the two sealing flanges 120, 122 define a gap 118, called a sealing flange gap, measured from the outer surfaces of where the sealing lips 124, 126 are formed. The exterior flange 134 has a width, defined by the two end edges 190, 192, that is larger than the sealing flange gap 118 to define the two flange overhangs 148, 150. In an example, the sealing flange gap 118 is about 30% to 80% of the width of the cover flange 134, with the range of 40% to 65% being more preferred. Each of the two flange overhangs 148, 150 is part of the cover flange 134 and extends axially, relative to the axis defined by the centerline ℄, away from the two sealing flanges 120, 122. Each flange overhang 148, 150 comprises an interior surface 142 and an exterior surface 136, and by extension the cover flange or exterior flange 134 has an interior surface 142 and an exterior surface 136. The interior surface 142 of the cover flange 134 at the two flange overhangs 148, 150 can press against the flange seats 196, 198 of the two structural elements 108, 110 to ensure a positive seal at the interface thereof. For example, the cover flange 134 can be formed with an inside diameter (ID) defined at the interior surface 142 to provide a slight interference fit against the two flange seats 196, 198 of the two structural components. In some examples, the cover flange 134 can have a size on size fit with the flange seats 196, 198 without interference. In still other examples, the two end edges 190, 192 can be sized to press against the adjacent surface of the adjacent structural component 108, 110.

The flange seat 196 and the seal contact surface 300 of the first structural element 108 have surfaces that are angled to one another. As shown, the surface of the flange seat 196 is approximately at right angle to the surface of the seal contact surface 300 of the first structural element. In other examples, due to the shape of the first structural element 108, the angle can vary from right angle, such as being less than 90 degrees or greater than 90 degrees. Similarly, the flange seat 198 and the seal contact surface 302 of the second structural element 110 have surfaces that are angled to one another. As shown, the surface of the flange seat 198 is approximately at right angle to the surface of the seal contact surface 302 of the second structural element 110. In other examples, due to the shape of the second structural element, the angle can vary from right angle, such as being less than 90 degrees or greater than 90 degrees. Because the first structural component, the second structural component, or both the first and second structural components have surfaces that are angled to one another, the seal assembly 100 of the present embodiment can seal against the two surfaces that are angled to one another of one or both structural components.

In the embodiment of FIG. 1, the spring energized sealing lips 124, 126 provide the sealing force at a location below or inwardly of the flange overhangs 148, 150, or interiorly relative to the cover flange 134. The sealing forces in the present embodiment between the seal element 102 and the structural components 108, 110 can be forces that are axial relative to the axis defined by the centerline ℄, and optionally radial to the centerline, such as between the ID of the cover flange 134 and the two flange seats 196, 198. For example, the spring element 104 can bias the two sealing flanges 120, 122 to force the seal lips 124, 126 to seal against the two seal contact surfaces 300, 302 of the two structural components 108, 110 with forces that are generally parallel to the centerline ℄ and the annular configuration of the cover flange 134 can be sized so that the interior surface 142, or the ID, presses against the two flange seats 196, 198 with forces that are generally radial to the axis defined by the centerline ℄.

In an example, a flange stub 128 can be incorporated. When incorporated, the flange stub 128 can extend from the interior surface 142 of the cover flange 134 towards the centerline ℄, similar to the two sealing flanges 120, 122. The flange stub 128 can be located between the two sealing flanges 120, 122 and can have a length that is substantially shorter than the length of the two sealing flanges 120, 122. In the example shown, the flange stub 128 is incorporated to set the location or position of the spring element 104 within the spring cavity 116. For example and as shown, the flange stub 128 pushes the spring element 104 away from the cover flange 134 towards the centerline ℄. In effect, this positions the spring element 104 to contact the two sealing flanges 120, 122 at locations on the two sealing flanges that are closer to the centerline than when the seal element 102 is without a flange stub 128. The flange stub 128 therefore moves the spring element 104 to control where the sealing flanges 120, 122 contact the minor axes, the shorter of the two axes, of the plurality of coils 130 of the spring element 104. Spring elements described herein may be made from any number of conventional metallic materials and can optionally be plated or coated with a second metallic layer or coat.

The flange stub 128 is preferably located equally spaced between the two sealing flanges 120, 122 in the spring cavity 116. However, the flange stub 128 can be omitted or can be off-centered between the two sealing flanges 120, 122. The edge of the flange stub 128 that contacts the spring energizer 104 can be generally flat. In other examples, the surface of the flange stub that contacts the spring energizer 104 can be concave to receive an arc section of the plurality of coils 130 of the spring energizer 104. In still other examples, the surface that contacts can have a convex surface. As shown, even when a flange stub 128 is incorporated, the spring element 104 is recessed inside the spring cavity 116, which is understood to mean recessed inside, or away from the centerline, the interior-most surfaces of the two sealing flanges 120, 122. In contrast and as further discussed below, the spring element 104 of FIG. 2 projects outwardly of the spring cavity 116, which is understood to mean outwardly of the interior-most surfaces of the two sealing flanges 120, 122.

The seal element 102 can be unitarily formed with a seal body 106 having the various components shown, such as the cover flange 134, the two sealing flanges 120, 122, and the flange stub 128, if incorporated. Each of the two sealing flanges 120, 122 can have a base 120a, 122a attached to the cover flange 134 and a remote flange arm portion 120b, 122b extending from the base 120a, 122a and remote from the cover flange 134. The base 120a, 122a of each sealing flange 120, 122 can have a thickness and the remote flange arm portion 120b, 122b can have a thickness and the thickness of the remote flange arm portion can be larger or thicker than the thickness of the base. Each sealing flange 120, 122 can have an end stub at the end of the remote flange arm 120b, 122b. The two end stubs at the two ends of the two remote flange arms 120b, 122b reduce the opening to the seal cavity or spring cavity 116, making the spring energizer 104 more difficult to slip out of the spring cavity 116 during service or during installation. The two sealing flanges 120, 122 have end most surfaces 120c, 122c (FIG. 2) that define an inside diameter of the sealing element 102.

During use or when the seal assembly 100 is in service, the seal assembly 100 may be exposed to an external environment 140 that may be dirty or contaminated. For example, particulates, debris, dust, organic matters, etc. may be pushed around or agitated by air flow or breeze in the external environment 140, which can then deposit in cracks and crevices, including in the seal cavity or spring cavity 116 and between the cover flange 134 and the surfaces of the first and second structural elements 108, 110 that contact the seal body 106 of the seal element 102. Thus, by incorporating a cover flange 134 with two flange overhangs 148, 150 with end edges 190, 192, which the sealing flanges 120, 122 recessed axially inwardly thereof, the seal element 102 provides a cover or outer seal protection to prevent contaminants from reaching the seal cavity 116, and can also prevent contaminants from reaching the interface between the two sealing flanges 120, 122 and the two corresponding seal contact surfaces 300, 302. As further discussed below, seal assemblies of the present invention can also incorporate additional sealing points aside from seals between the seal lips and the structural components to provide additional seals from contaminants.

As shown, the FIG. 1 embodiment shows a seal assembly comprising at least two sealing points or locations. The first sealing point or location is between the cover flange 134, and more particularly the interior surfaces of the two flange overhangs 148, 150, and the flange seats 196, 196 of the first and second structural components 108, 110. The second sealing point or location is between the two sealing lips 124, 126 of the two sealing flanges 120, 122 and the two seat contact surfaces 300, 302 of the first and second structural components 108, 110. In the present embodiment, the first sealing point or location, which can have two discrete first sealing points at each of the two flange seats 190, 192 and the cover flange 134, can be located axially outwardly of the second sealing point or location, which can have two discrete second sealing points at each of the two sealing lips 124, 126 of the two sealing flanges 120, 122 and the two seat contact surfaces 300, 302 of the first and second structural components 108, 110.

For seal assemblies 100 and spring components disclosed herein, which include a seal element that is configured to bias and seal against two structural components by applying sealing forces in an axial direction and optionally also in the radial direction relative to an axis defined by the centerline ℄, it is understood that where a feature is shown but not expressly described and is otherwise the same or similar to the feature or features described elsewhere, such as above with reference to FIG. 1, the disclosed part or parts shown in all the drawing figures but not expressly described because of redundancy and because knowledge is built on a foundation laid by earlier disclosures may nonetheless be understood to be described or taught by the same or similar features expressly set forth in the text for the embodiments in which the feature or features are described. Said differently, subsequent discussions of the present application are built upon the foundation of earlier discussions unless the context indicates otherwise. The application disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following seal assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

FIG. 2 shows a seal assembly 100 in accordance with further aspects of the invention. The present embodiment is similar to the embodiment of FIG. 1 with a few exceptions. In the FIG. 2 embodiment, the seal assembly 100 comprises a sealing component 102, or seal element, and a spring energizer 104 for biasing two sealing lips away from one another to seal against two structural elements 108, 110. The present sealing component 102 can comprise a seal body 106 having two sealing flanges 120, 122 defining a seal cavity or spring cavity 116. A spring energizer 104 can be a V spring, such as those disclosed in U.S. Pat. Nos. 2,434,484 and 2,630,343 and U.S. Publication No. 2018/0266562, the contents of which are expressly incorporated herein by reference.

The spring energizer 104 of the present embodiment can be located in the spring cavity 116 for biasing the two sealing flanges 120, 122 away from one another to push the two seal lips 124, 126 on the two sealing flanges against the seal contact surfaces 300, 302 of the two structural components 108, 110, in an axial direction relative to the axis defined by centerline ℄, to seal against the seal contact surfaces 300, 302. Each of the two sealing flanges 120, 122 has a seal lip 124, 126 and the two seal lips are configured to seal, via axially biasing forces generated by the spring element 104, against the two seal contact surfaces 300, 302 of the two structural components 108, 110. The seals formed by the seal assembly 100 with the two seal contact surfaces 300, 302 of the two structural components 108, 110 limit or restrict unwanted contaminants from entering and depositing in the spring cavity 116.

Like the seal element 102 of FIG. 1, each sealing flange of the two seal flanges 120, 122 of the present seal element 102 comprises a base 120a, 122a and a remote flange arm portion 120b, 122b. The remote flange arm portion 120b, 122b of each sealing flange is thicker than the thickness of the corresponding base. In the present embodiment, the two sealing flanges 120, 122 are not recessed from the two end edges 190, 192 of the cover flange 134, which has an exterior surface 136 and an interior surface 142. In an example, the two bases 120a, 122a of the two sealing flanges have outer surfaces that are co-planar with the two end edges 190, 192.

Each sealing flange 120, 122 of the present embodiment has a radial-end-most surface 120c, 122c at the end of the remote flange arm portion 120b, 122b. The two radial-end-most-surfaces 120c, 122c of the two sealing flanges 120, 122 define an inside diameter (ID) or bore diameter of the seal element 102. In an example, the bore diameter, or inside diameter of the seal element 102, is sized to form an interference fit with the two flange seats 196, 198 of the two structural components 108, 110 to thereby form seals at the interfaces where they contact. Thus, like the seal assembly of FIG. 1, the present seal assembly also has at least two sealing points. The first sealing point or location is between two sealing lips 124, 126 and the two seal contact surfaces 300, 302 of the two structural components 108, 110. The second sealing point or location is between the two radial-end-most-surfaces 120c, 122c of the two sealing flanges 120, 122 and the two flange seats 196, 196 of the two structural components 108, 110. Each sealing point or location can have two discrete sealing points or locations, as previously discussed with reference to FIG. 1.

In the present embodiment, the first sealing point or location, which can have two discrete first sealing points at each of the seal contact surfaces 300, 302 and the two sealing lips 124, 126, can be located axially outwardly of the second sealing point or location, which can have two discrete second sealing points at each of the two radial-end-most surfaces 120c, 122c of the two sealing flanges 120, 122 and the flange seats 196, 198 of the first and second structural components 108, 110.

In an example, the seal assembly of the present embodiment has only the first sealing point or location between the seal contact surfaces 300, 302 and the two sealing lips 124, 126 and not the second sealing point or location. In other words, the inside diameter of the seal element 102 can have a size on size or a loose fit around the flange seats 196, 198. This is because the first sealing point or location, which is located axially outwardly of the second sealing point or location, can provide adequate sealing from contaminants without resorting to the second sealing point or location. More specifically, since the seals between the seal contact surfaces 300, 302 and the two sealing lips 124, 126 are biased or urged by the spring element 104, additionally seals may not be necessary, although optional. Like the seal assembly of FIG. 1, the seal assembly 100, and more specifically the exterior surface 136 of the cover flange 134 is configured to be exposed to or faces the atmosphere 140. More specifically, the cover flange 134 is configured to operate outside of a pressurized environment, excluding atmospheric pressure.

As shown, the V-spring comprises a plurality of interconnected V-elements 154 (only one shown) each with two spring legs 156, 158 joined together at a joining end 160. The two spring legs 156, 158 bias the two sealing flanges 120, 122 away from one another to bias the two sealing lips 124, 126 against the two structural components. As shown, the two sealing flanges 120, 122 have been modified or re-positioned to be closer to the exterior flange 134 and extend from the end edges 190, 192 of the exterior flange or cover flange 134. The two spring legs 156, 158 have free ends 156a, 158a that contact the interior surface 142 of the exterior flange 134. In alternative embodiments, the free ends 156a, 158a can be spaced from the interior surface 142 of the exterior flange or cover flange 134.

In the present embodiment, the free ends 156a, 158a of the V-element 154 face or point in the direction of the cover flange 134 while the joining end 160 faces or points away from the cover flange 134, in the direction of the centerline. Additionally, the spring element 104 has portions that project outwardly of the seal element 102. For example, the joining ends 160 of the V-elements 154 (only one shown), and part of the two spring legs 156, 158, project outwardly of the radial-end-most surfaces 120c, 122c of the two sealing flanges, which define the inside diameter of the seal element 102, toward the centerline □.

FIG. 3 shows an alternative seal assembly 100 that is similar to the seal assembly of FIG. 2. In the present embodiment, two support bands 164, 166 are provided at the interior surface 142 of the exterior flange or cover flange 134 to support each of the two end edges of the free ends 156a, 158a of the two spring legs 156, 158 and to prevent the two end edges from digging into the cover flange 134. In an example, the two support bands 164, 166 can be made from a material that is harder than the material of the sealing component, for example from a metallic or alloy material or from a hard plastic. The two support bands 164, 166 can be made from the same material or from two different materials, such as two different metallic materials or one from a metallic material and the other from a hard plastic material.

FIG. 4 shows a seal assembly 100 that is similar to the seal assembly of FIGS. 2 and 3 except a single support band 164 can be used to support the two end edges of the two free ends 156a, 158a of the two spring legs 156, 158. In some examples, a support band 164 can also be used to support a canted coil spring. For example, the single support band 164 of FIG. 4 can be used to support the canted coil spring of FIG. 1 or of FIG. 5, as further discussed below.

Figure 5:
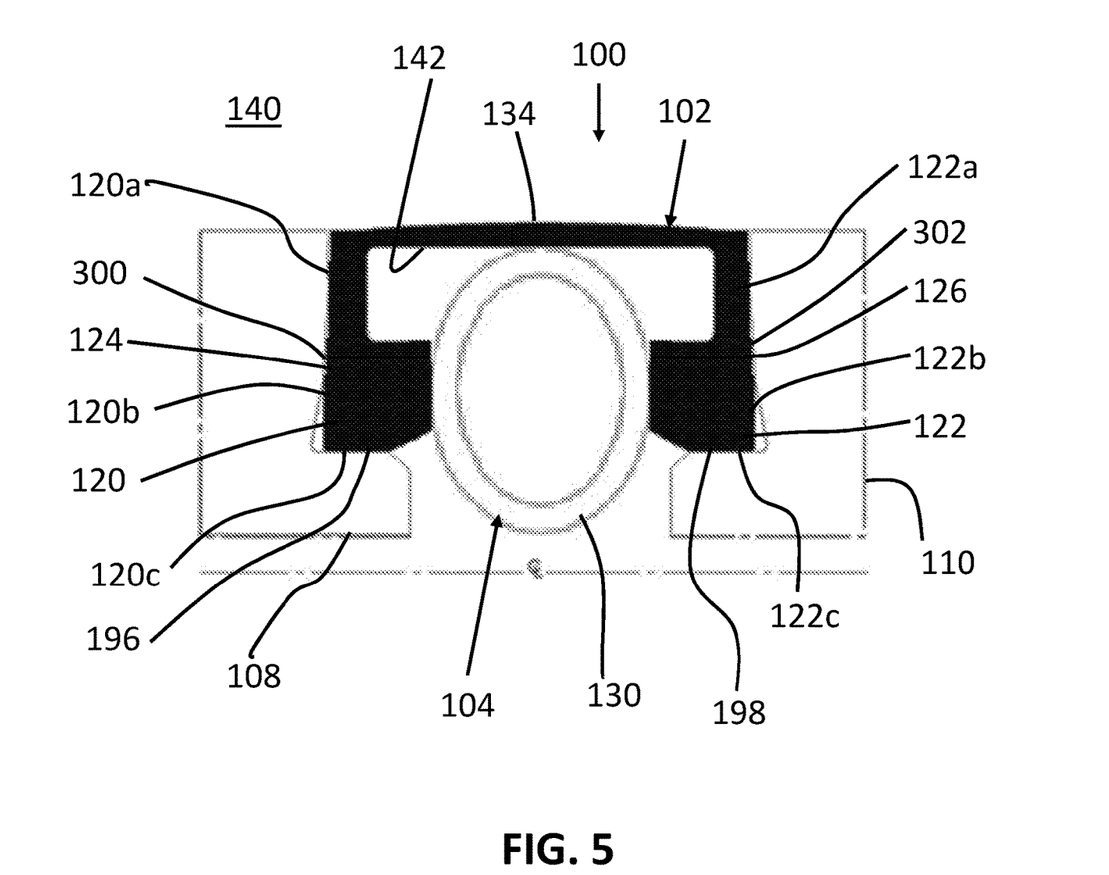
FIG. 5 is a partial cross-sectional side view of still yet another seal assembly sealing against two structural components, shown in dashed lines.

FIG. 5 shows an alternative seal assembly 100 that is similar to the seal assembly of FIGS. 2-4 with a few exceptions. In the present embodiment, the two bases 120a, 122a of the two sealing flanges 120, 122 have been elongated compared length of the two bases 120a, 122a of the seal elements of FIGS. 2-4 in order to extend the positions or locations of the two remote flange arm portions 120b, 122b toward the centerline □. This lengthening of the bases 120a, 122a extend the two remote flange arm portions 120b, 122b further toward the centerline so that the minor axes of the plurality of spring coils 130 (only one shown) of the spring element 104 directly contact the two remote flange arm portions 120b, 122b.

As shown, the minor axes of the spring coils 130 directly contact the remote flange arm portions 120b, 122b of the two sealing flanges 120, 122 to bias the sealing lips 124, 126 against the two seal contact surfaces 300, 302 of the two structural components 108, 110. In other examples, the lengths of the two bases 120a, 122a can remain substantially the same compared to the bases of FIGS. 2-4 and instead the lengths of the remote flange arm portions 120b, 122b are lengthened compared to the lengths of the remote flange arm portions 120b, 122b of other seal elements discussed elsewhere herein. In yet other examples, both the bases 120a, 122a and the remote flange arm portions 120b, 122b of the two sealing flanges 120, 122 are adjusted to ensure direct contact between the minor axes of the plurality of coils 130 and the remote flange arm portions 120b, 122b.

Another difference between the present seal assembly 100 and the seal assemblies of FIGS. 2-4 is the use of a canted coil spring as a spring element 104 instead of a V-spring. As shown, at least a portion of each spring coil 130 extend outwardly of the radial-end-most surfaces 120c, 122c, or bore diameter, toward the centerline □. Optionally, a support band, similar to the support band 164 of FIG. 4, may be used between the spring element 104 and the interior surface 142 of the cover flange 134 to protect the cover flange 134 from being scuffed up by the coils 130.

Figure 6:
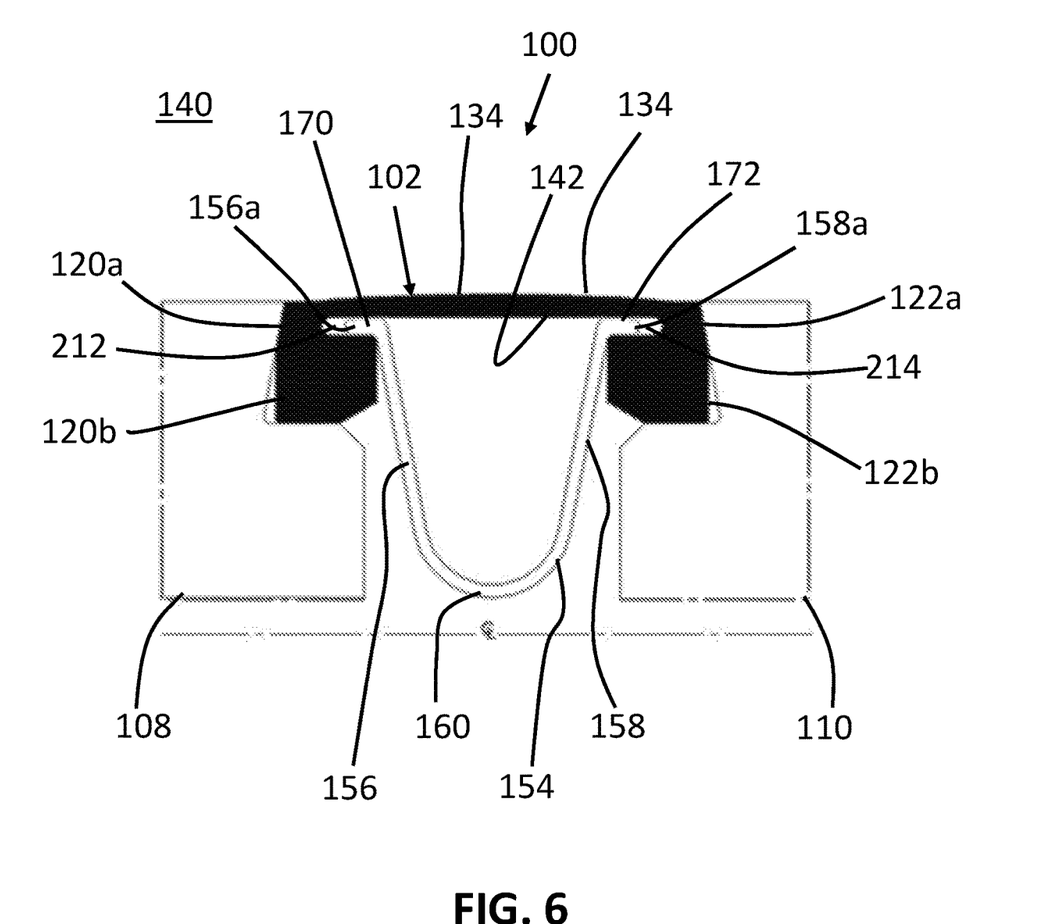
FIG. 6 is a partial cross-sectional side view of yet another seal assembly sealing against two structural components, shown in dashed lines.

FIG. 6 shows an alternative seal assembly 100 that is similar to the seal assembly of FIGS. 2-4. In the present embodiment, the two spring legs 156, 158 have been modified so that generally flat or generally planar end surfaces 170, 172 are provided at the end opposite the joining end 160 of the V-element 154. In an example, the generally planar end surfaces 170, 172 are formed by bending the two free ends 156a, 158a of the two spring legs 156, 158 to have short end stubs that define the two planar end surfaces 170, 172. Thus, when the two generally planar end surfaces 170, 172 are pushed against the interior surface 142 of the cover flange 134, the two generally planar end surfaces 170, 172 do not bite or cut into the cover flange 134 compared to when the two edges of the two free ends 156a, 158a of the V-elements are allowed to directly push against the cover flange. The present V-spring can therefore be used with the seal element without the need for one or more support band although they can be used or incorporated.

As shown, the seal element 102 of the present embodiment, as well as the embodiments of FIGS. 2-4, has two channels 212, 214, one between each of the two remote flange arm portions 120b, 122b and the cover flange 134. The gap of each of the two channels 212, 214 can be adjusted by adjusting the length or thickness of the base portion 120a, 122a, the remote flange arm portion 120b 122b or both of each sealing flange 120, 122. The dimension of each channel can be selected to accommodate the planar end surfaces 170, 172 of the spring legs 156, 158, the support bands 164, 166 (FIGS. 3 and 4), or both the planar end surfaces and the support bands.

Methods of making and of using seal assemblies and components thereof, such as the seal assemblies and components shown in FIGS. 1-6, are within the scope of the present invention.

Although limited embodiments of the seal assemblies and their components have been specifically described and illustrated herein, many modifications and variations will be apparent to those skilled in the art. Accordingly, it is to be understood that the seal assemblies and their components constructed according to principles of the disclosed device, system, and method may be embodied other than as specifically described herein. The disclosure is also defined in the following claims.

What is claimed is:

1. A seal assembly comprising:

a sealing component and a spring energizer comprising a V-spring or a canted coil spring;

said sealing component comprising two sealing flanges defining a seal cavity, a seal lip located on each of the two sealing flanges, and a cover flange having an exterior surface and an interior surface;

said spring energizer positioned within said seal cavity for biasing the two sealing flanges away from one another to provide a load onto said seal lips for sealing against two different surfaces;

wherein radial-end-most surfaces of the two sealing flanges define an inside diameter of the sealing component and the exterior surface is configured to be exposed to the atmosphere when in service, the inside diameter being a smallest inside dimension of the sealing component;

wherein each of the two sealing flanges has a base attached to the cover flange and has a remote flange arm portion opposite the base;

wherein each of the two sealing flanges has a section closer to the remote flange arm portion that is larger or thicker than a section that is closer to the base; and wherein coils of the canted coil spring or V-elements of the V-spring extend externally of the seal cavity towards a centerline of said sealing component.

2. The seal assembly of claim 1, wherein the spring energizer biases the remote flange arm portions of the two sealing flanges apart.

3. The seal assembly of claim 1, wherein the seal assembly is without a backing ring.

4. The seal assembly of claim 1, further comprising a support band located between the spring energizer and the sealing component.

5. The seal assembly of claim 1, wherein each V-element comprises two spring legs that point away from the centerline of said sealing component.

6. The seal assembly of claim 5, wherein each of the two spring legs has a free end that points in a direction parallel to the centerline.

7. The seal assembly of claim 1, wherein a joining end of the V-spring that joins two spring legs extends outwardly of the seal cavity towards the centerline of said sealing component.

8. The seal assembly of claim 7, further comprising a support band located between the V-spring and the cover flange.

9. The seal assembly of claim 1, wherein the inside diameter of the sealing component is configured to form an interference fit with structural components to be sealed by the seal assembly.

10. A method of using a seal assembly, comprising:

placing the seal assembly between two adjacent structural components;

sealing a gap between the two adjacent structural components;

wherein the seal assembly comprises:

a sealing component and a spring energizer comprising a canted coil spring having a plurality of interconnected coils with each coil canted generally along a same direction or a V-spring having a plurality of V-elements;

said sealing component comprising two sealing flanges defining a seal cavity, a seal lip located on each of the two sealing flanges to define two seal lips, and a cover flange having an exterior surface and an interior surface;

said spring energizer is positioned within said seal cavity for biasing the two sealing flanges away from one another to provide a load onto said seal lips for sealing against two different surfaces of the two adjacent structural components;

wherein radial-end-most surfaces of the two sealing flanges define an inside diameter of the sealing component and wherein the exterior surface is configured to be exposed to the atmosphere when in service;

wherein portions of said plurality of interconnected coils or V-elements of the V-spring extend externally of the seal cavity towards a centerline of said sealing component; and wherein the exterior surface defines a continuous outside diameter that extends between the two sealing flanges.

11. The method of claim 10, wherein the inside diameter forms an interference fit with the two adjacent structural components.

12. The method of claim 10, wherein the two adjacent structural components comprise a first structural component and a second structural component, wherein a seal between one of the two seal lips and the first structural component is along a first surface of the first structural component and a seal between the inside diameter and the first structural component is along a second surface of the first structural component, and wherein the first surface and the second surface are angled to one another.

13. A seal assembly comprising a sealing component and a spring energizer, wherein the sealing component comprises a seal body having a cover flange with an exterior surface and an interior surface, two sealing flanges that include a first sealing flange and a second sealing extending away from the cover flange on a side of the interior surface, wherein radial-end-most surfaces of the two sealing flanges define an inside diameter of the sealing component and the exterior surface of the cover flange defines an outside diameter of the sealing component, and wherein canted coils of a canted coil spring or two leg elements of each of a plurality of V-elements of a V-spring are located in a seal cavity defined by the two sealing flanges and the cover flange and at least part of each of the canted coils of the canted coil spring or at least part of the two leg elements of each V-element of the V-spring extend externally of the seal cavity.

14. The seal assembly of claim 13, wherein the exterior surface of the cover flange that defines the outer diameter of the sealing component is generally planar from the first sealing flange to the second sealing flange.

15. The seal assembly of claim 13, wherein each of V-elements comprises two free ends.

16. The seal assembly of claim 13, further comprising a support band in contact with the interior surface of the cover flange and wherein the spring energizer is in contact with the support band.

17. The seal assembly of claim 13, wherein each V-element comprises two legs that point away from a centerline of said sealing component.

18. The seal assembly of claim 17, wherein each of the two leg elements comprises a bend and a segment with the segment pointing in a direction parallel to the centerline.

19. The seal assembly of claim 16, wherein the support band comprises two spaced apart sections.

20. The seal assembly of claim 1, wherein the exterior surface of the cover flange defines an outer diameter of the sealing component.

21. The method of claim 10, wherein the exterior surface of the cover flange defines an outer diameter of the sealing component.

22. The method of claim 10, wherein each V-element has two spring legs and each leg comprises a bend and a segment with the segment pointing in a direction parallel to the centerline.

23. The method of claim 10, wherein each V-element has two spring legs and each of the two spring legs has a free end that points in a direction of the centerline.

\* \* \* \* \*